US010279330B2

(12) United States Patent
McNaughton

(10) Patent No.: US 10,279,330 B2
(45) Date of Patent: May 7, 2019

(54) LOADING VERTICAL TUBES WITH PARTICULATE MATERIAL

(71) Applicant: Precision Consulting Services, LLC, San Leon, TX (US)

(72) Inventor: Michael D. McNaughton, San Leon, TX (US)

(73) Assignee: Precision Consulting Services, LLC, San Leon, TX (US)

( * ) Notice: Subject to any disclaimer, the term of this patent is extended or adjusted under 35 U.S.C. 154(b) by 133 days.

(21) Appl. No.: 15/142,875

(22) Filed: Apr. 29, 2016

(65) Prior Publication Data

US 2016/0317991 A1 Nov. 3, 2016

Related U.S. Application Data

(60) Provisional application No. 62/154,427, filed on Apr. 29, 2015.

(51) Int. Cl.
*B01J 8/06* (2006.01)
*B01J 8/00* (2006.01)

(52) U.S. Cl.
CPC .............. *B01J 8/06* (2013.01); *B01J 8/002* (2013.01); *B01J 8/003* (2013.01); *B01J 2208/00752* (2013.01)

(58) Field of Classification Search
CPC . B01J 8/003; B01J 8/002; B01J 8/0015; B01J 8/0045; B01J 8/06; B65G 69/0458; B65G 69/0466; A63H 33/40
USPC ............... D11/141, 148; D21/455, 458, 459; 414/160, 804, 808
See application file for complete search history.

(56) References Cited

U.S. PATENT DOCUMENTS

| 96,455 | A | | 11/1869 | Mattison | |
|---|---|---|---|---|---|
| 639,540 | A | | 12/1899 | Duncan | |
| 1,802,089 | A | | 4/1931 | Pfeiffer | |
| D110,858 | S | * | 8/1938 | Egerton | ....................... D11/121 |
| 2,515,713 | A | * | 7/1950 | Johnson | ............... A47J 43/0711 |
| | | | | | 416/175 |
| 2,524,560 | A | | 10/1950 | Cote | |

(Continued)

FOREIGN PATENT DOCUMENTS

| AU | 619036 | 9/1989 |
|---|---|---|
| CN | 2076322 | 5/1991 |

(Continued)

OTHER PUBLICATIONS

Blaine R. Copenheaver, International Search Report, Sep. 25, 2007, 3 pages, US Patent and Trademark Office, Patent Cooperation Treaty, Alexandria, US.

(Continued)

*Primary Examiner* — Andrew StClair
(74) *Attorney, Agent, or Firm* — Oathout Law Firm; Mark A. Oathout; Laura Tu

(57) ABSTRACT

The exemplary embodiments relate to dampening and uniform loading devices and methods for loading a particulate material inside a vertical tube and include a columnar body having a longitudinal axis aligned in a vertical direction and a plurality of yielding lines. Each respect yield line is fixed at a first end and at a second end to the columnar body, and has a free-standing portion between the first end and the second end. The free-standing portion is configured to spiral around the columnar body.

21 Claims, 3 Drawing Sheets

(56) References Cited

U.S. PATENT DOCUMENTS

| | | | |
|---|---|---|---|
| 3,207,238 | A | 9/1965 | Davidson et al. |
| 3,549,465 | A * | 12/1970 | Skelley, Jr. ............ A47G 33/08 |
| | | | 428/11 |
| 3,608,751 | A | 9/1971 | Hundtofte |
| 4,077,530 | A | 3/1978 | Fukusen et al. |
| 4,176,997 | A | 12/1979 | Hungerbach |
| 4,321,738 | A | 3/1982 | Makhijani |
| 4,433,707 | A | 2/1984 | Farnham |
| 4,472,063 | A | 9/1984 | Eickelmann |
| 4,557,637 | A | 12/1985 | Barclay et al. |
| 4,883,363 | A | 11/1989 | Pillon et al. |
| 5,080,873 | A | 1/1992 | Ono et al. |
| 5,082,414 | A | 1/1992 | Taupin |
| 5,113,918 | A | 5/1992 | McGregor |
| 5,130,169 | A * | 7/1992 | DeJaynes ................ D04D 7/10 |
| | | | 156/294 |
| 5,147,612 | A | 9/1992 | Real |
| 5,160,227 | A | 11/1992 | Tramezzani |
| 5,236,054 | A | 8/1993 | Jack et al. |
| 5,238,035 | A | 8/1993 | Poussin et al. |
| 5,247,970 | A | 9/1993 | Ryntveit et al. |
| 5,393,189 | A | 2/1995 | Berquist |
| 5,405,246 | A * | 4/1995 | Goldberg ................ F03D 3/061 |
| | | | 416/227 A |
| 5,585,075 | A | 12/1996 | Takano et al. |
| 5,758,699 | A | 6/1998 | Haquet et al. |
| 5,890,868 | A | 4/1999 | Comardo |
| 5,906,229 | A | 5/1999 | Haquet et al. |
| 6,035,618 | A * | 3/2000 | Fogle ................ A01D 34/4166 |
| | | | 30/276 |
| 6,182,716 | B1 | 2/2001 | Fry |
| 6,467,513 | B1 | 10/2002 | Yanaru et al. |
| 6,497,259 | B1 | 12/2002 | Wegman |
| 6,712,496 | B2 | 3/2004 | Kressin et al. |
| 6,725,706 | B2 | 4/2004 | Johns et al. |
| 6,810,921 | B2 | 11/2004 | Schlosser |
| 6,817,389 | B2 | 11/2004 | Dovesi |
| 6,832,944 | B2 | 12/2004 | Ostrow |
| 6,981,422 | B1 | 1/2006 | Comardo |
| 7,673,496 | B2 | 3/2010 | Johns et al. |
| 7,673,660 | B2 | 3/2010 | McNaughton |
| 7,712,490 | B2 * | 5/2010 | Brennom ................ B01J 8/003 |
| | | | 141/12 |
| 7,753,086 | B2 | 7/2010 | Dessen |
| 7,765,948 | B2 | 8/2010 | Johns et al. |
| 7,818,995 | B2 | 10/2010 | Johns et al. |
| 7,913,543 | B2 | 3/2011 | Johns et al. |
| 8,025,472 | B2 | 9/2011 | Fry |
| 8,182,758 | B2 | 5/2012 | Oliveira et al. |
| D705,499 | S * | 5/2014 | Zamarripa .................... D30/124 |
| 2003/0031536 | A1 | 2/2003 | Boe et al. |
| 2004/0217039 | A1 | 11/2004 | Jardin et al. |
| 2004/0233775 | A1 | 11/2004 | van der Eerden et al. |
| 2006/0233631 | A1 | 10/2006 | Diehl et al. |
| 2007/0084519 | A1* | 4/2007 | Brennom ............... B01J 8/0015 |
| | | | 141/2 |
| 2011/0150624 | A1 | 6/2011 | Fry |
| 2015/0343323 | A1* | 12/2015 | Sidwell ................. A63H 33/40 |
| | | | 416/131 |

FOREIGN PATENT DOCUMENTS

| | | |
|---|---|---|
| CN | 2607322 | 3/2004 |
| EP | 1050465 | 11/2000 |
| EP | 1348649 | 1/2003 |
| EP | 1283070 | 2/2003 |
| EP | 1374985 | 1/2004 |
| EP | 1749568 | 2/2007 |
| GB | 468721 | 7/1937 |
| JP | 61106401 | 5/1986 |
| JP | 10296073 | 11/1998 |
| NO | 319630 | 6/2005 |
| WO | 2004/028679 | 4/2004 |
| WO | 2004096428 | 11/2004 |
| WO | 2009021723 | 2/2009 |

OTHER PUBLICATIONS

Blaine R. Copenheaver, Written Opinion of the International Searching Authority, dated Sep. 25, 2007; 4 pages, US Patent and Trademark Office, Patent Cooperation Treaty, Alexandria, US.

British Sulphur Publishing, Critical Loading, Nitrogen and Methanol, Jan. 1, 2004, p. 50-55, No. 267, British Sulphur Publishing, London, GB.

Mimmi Westman/EK, International Search Report, dated Dec. 16, 2003, 2 pages, ISA/Swedish Patent Office, Sweden.

Thomas, Shane, PCT International Search Report for International Application No. PCT/US2016/030182, dated Aug. 11, 2016, 2 pages, Alexandria, Virginia, United States.

Thomas, Shane, PCT Written Opinion of the International Searching Authority for International Application No. PCT/US2016/030182, dated Aug. 11, 2016, 5 pages, Alexandria, Virginia, United States.

Midrex Corporation, Erection Manual Catalyst Filling Instructions for REFORMEX® 7 and REFORMEX® 8 Catalysts Natural Gas Reforming Catalysts, Mar. 31, 1987, 3 pages, Midrex Corporation, Charlotte, North Carolina, United States.

Shin, Ju Cheol, Written Opinion of the International Searching Authority for International Application No. PCT/US2008/065546, dated Aug. 26, 2008, 4 pages, Korean Intellectual Property Office, Republic of Korea.

Shin, Ju Cheol, International Search Report for International Application No. PCT/US2008/065546, dated Aug. 26, 2008, 3 pages, Korean Intellectual Property Office, Republic of Korea.

Japan Patent Office, Office Action for Japan Patent Application No. 2008-503180, dated Jun. 5, 2012, 3 pages, Japan Patent Office, Japan.

Thomasson, Philippe, Supplementary European Search Report for EP 08769983, dated Aug. 3, 2011, 3 pages, European Patent Office, Munich, Germany.

Patent Office of the Russian Federation, Office Action for Patent Application 2007139254 in Russia, dated Feb. 4, 2010, 2 pages, Patent Office of the Russian Federation, Moscow, Russia.

Thomasson, Philippe, Supplementary European Search Report for EP 06739379, dated Dec. 3, 2010, 3 pages, European Patent Office, Munich, Germany.

* cited by examiner

LOADING VERTICAL TUBES WITH PARTICULATE MATERIAL

STATEMENTS REGARDING FEDERALLY SPONSORED RESEARCH OR DEVELOPMENT

Not Applicable.

NAMES OF THE PARTIES TO A JOINT RESEARCH AGREEMENT

Not Applicable.

REFERENCE TO A "SEQUENCE LISTING", A TABLE, OR A COMPUTER PROGRAM

Not Applicable.

BACKGROUND

Technical Field

The exemplary embodiments relate to techniques and apparatus for loading particulate material such as, for example, catalyst into vertical tubes such as, for example, in a catalyst reactor.

For reference to existing descriptions of catalyst loading devices and methods please see U.S. Pat. Nos. 7,673,660; 8,182,758; and 5,247,970 the disclosures of which are hereby incorporated by reference.

SUMMARY

The exemplary embodiments relate to dampening and uniform loading devices and methods for loading a particulate material inside a vertical tube and include a columnar body having a longitudinal axis aligned in a vertical direction and a plurality of yielding lines. Each respect yield line is fixed at a first end and at a second end to the columnar body, and has a free-standing portion between the first end and the second end. The free-standing portion is configured to spiral around the columnar body.

As used herein the terms "radial" or "radially" include directions outward toward the inner wall of a tube (such as a tube in a catalyst reactor) but are not limited to directions perpendicular to an axial direction of the tube. Rather such directions, although including perpendicular and outward toward the inner wall of the tube, also include those transverse and/or off center yet moving outward or even against the surface of the inner wall of the tube.

BRIEF DESCRIPTION OF THE DRAWINGS

The exemplary embodiments may be better understood, and numerous objects, features, and advantages made apparent to those skilled in the art by referencing the accompanying drawings. These drawings are used to illustrate only exemplary embodiments of this disclosure, and are not to be considered limiting of its scope, for the disclosure may admit to other equally effective exemplary embodiments. The figures are not necessarily to scale and certain features and certain views of the figures may be shown exaggerated in scale or in schematic in the interest of clarity and conciseness.

DESCRIPTION OF EXEMPLARY EMBODIMENT(S)

The description that follows includes exemplary apparatus, methods, techniques, and instruction sequences that embody techniques of the disclosed subject matter. However, it is understood that the described exemplary embodiments may be practiced without these specific details.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the disclosed subject matter.

Figure 1:
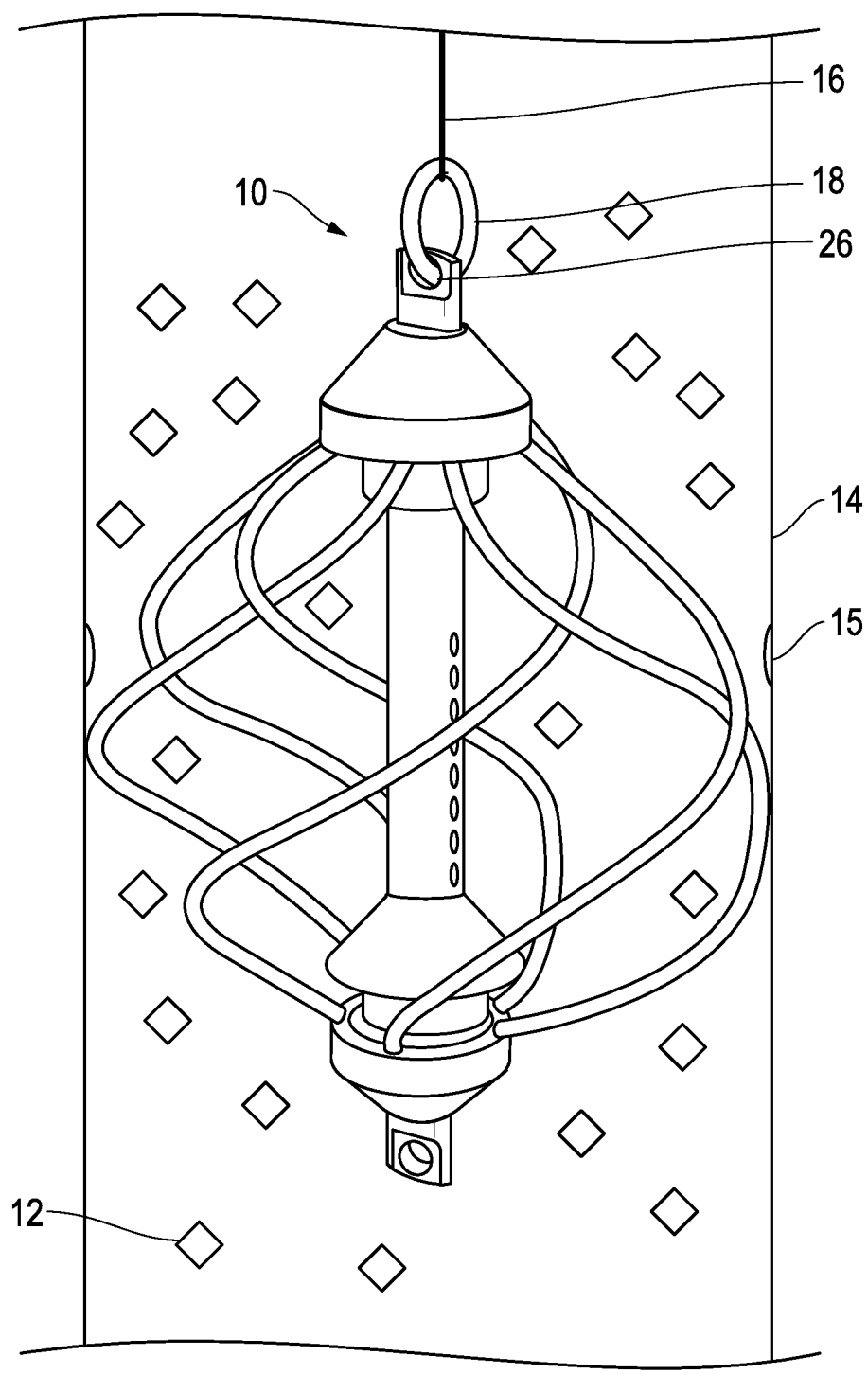
FIG. 1 depicts a schematic elevation view of an exemplary embodiment of a dampening and uniform loading device in its working environment where the working environment is shown in cross section.

FIG. 1 depicts a dampening and uniform loading device 10 which may be used to load particulate material (such as catalyst) 12 into a tube 14. One or more dampening and uniform loading devices 10 are generally mounted on feed line 16 and may include rotating connectors 18 as taught by McNaughton in U.S. Pat. No. 7,673,660 the disclosure and teachings of which are hereby incorporated by reference.

The tube 14 may have various regions of dis-uniformity such as, for example, regions of tube weld and weld impingement 15, bends in the tube (not shown), etc.

The feed line 16 is used to lower (e.g. slow controlled descent) the dampening and uniform loading device(s) 10 into the tube 14 and to raise the dampening and uniform loading device(s) 10 out of the tube 14 as the tube 14 is being filled. The dampening and uniform loading device(s) 10 may be lowered and raised from the tube 14 by any known means or technique.

The dampening and uniform loading device(s) 10 may be connected to the feed line 16 via the rotating connector 18 (or any other known means for rotating the dampening and uniform loading devices 10). The rotating connector 18 may be connected at any desirable point along the feed line 16 and as shown is connected at the lower end. The rotating connector 18 may for example be a stainless steel rotating or rotational device such as known to one of ordinary skill in the art. Stainless steel chain links 17 may be used to join the rotating connector 18 to the feed line 16, or the rotating connector 18 to the dampening and uniform loading device 10. The rotating connector 18 allows the dampening and uniform loading device(s) 10 to rotate without twisting the feed line 16 during a particulate material (such as catalyst) 12 loading or filling operation.

Figure 2:
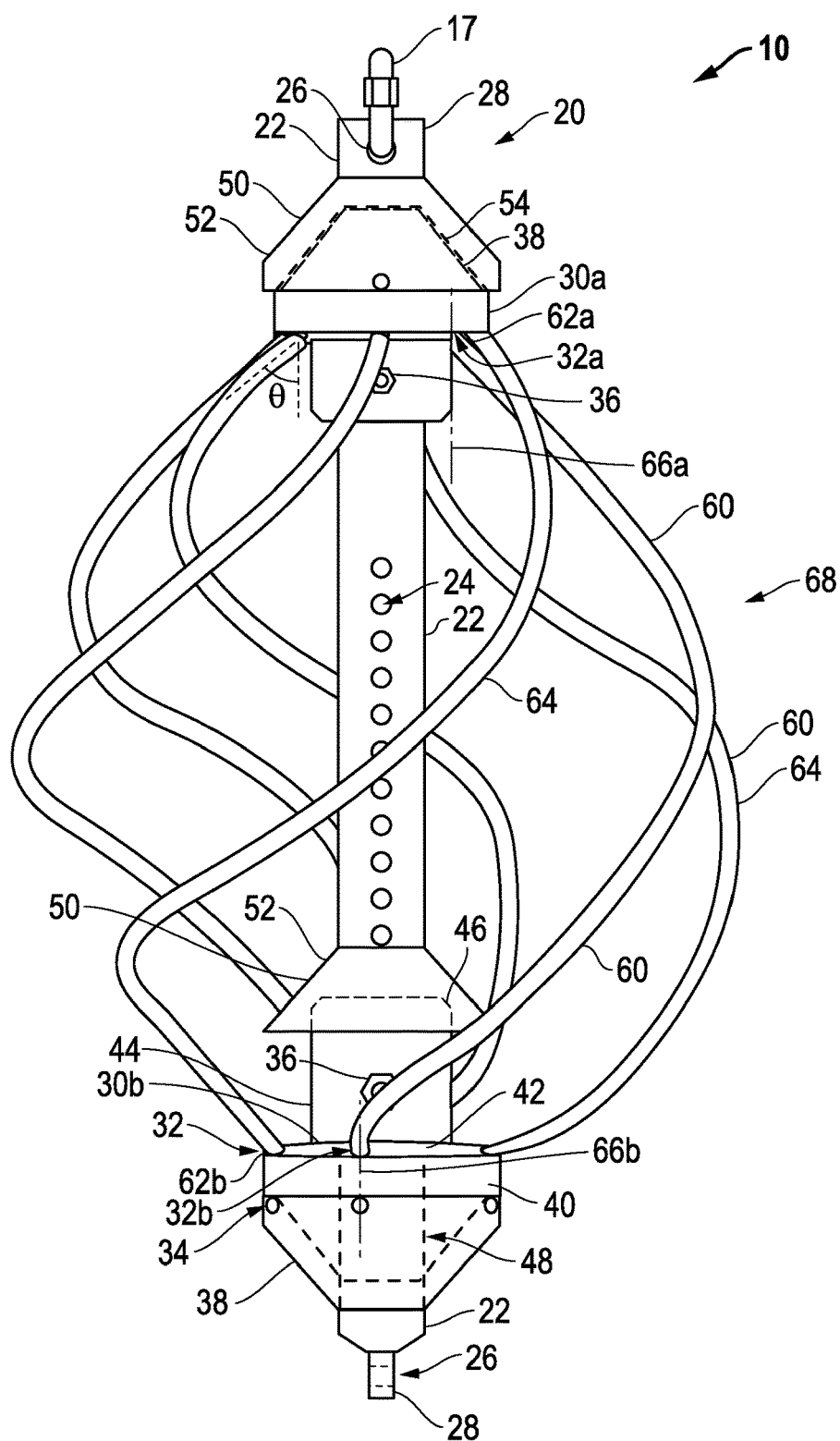
FIG. 2 depicts an elevation view of an exemplary embodiment of a dampening and uniform loading device.
Figure 3:
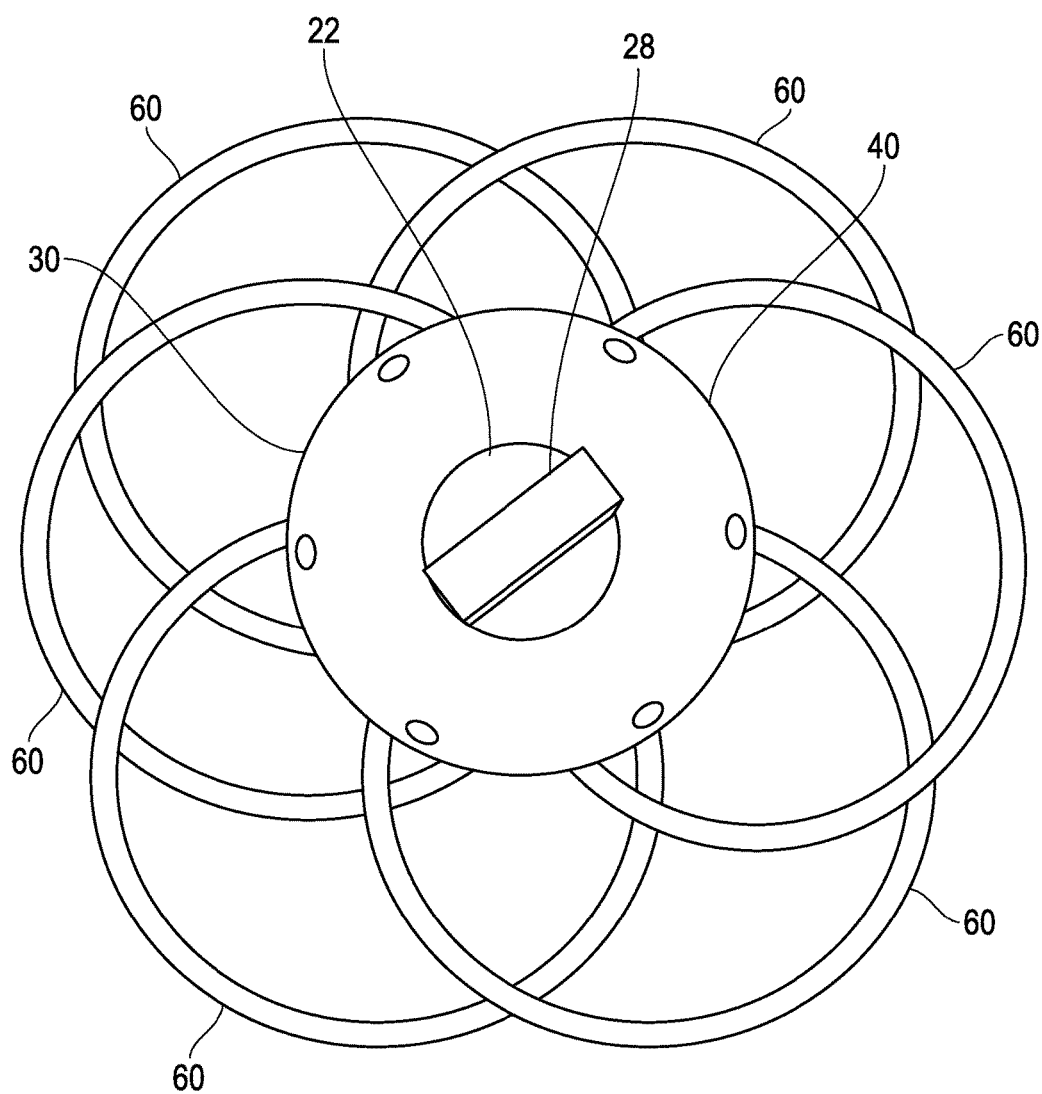
FIG. 3 depicts a bottom view of an exemplary embodiment of a dampening and uniform loading device.

Referring to FIG. 2 and FIG. 3, the dampening and uniform loading device(s) 10 generally have a columnar body 20 and a plurality of yield lines 60. Each of the plurality of yield lines 60 has a first end 62a and a second end 62b that are fixed to the columnar body 20. Once the ends 62a, 62b are fixed, each of the plurality of yield lines 60 also has a free-standing portion 64 between the first end 62a and the second end 62b. Such free-standing portion(s) 64 spiral around and spaced away from the columnar body 20.

The columnar body 20 generally has a rod 22, first and second hubs 30a, 30b, and glancing impingement device(s) 50. The rod 22 and accordingly the columnar body 20 have a longitudinal axis aligned in a vertical direction when the dampening and uniform loading device(s) 10 is in the tube 14. The rod 22 has holes 24 horizontally through the rod 22. Preferably the rod 22 has many holes 24 allowing for user selection of a desired height or position for attachment of the first and second hubs 30a, 30b. Further the rod 22 has means of attachment such as an opening 26 through a narrowed tip 28 for connecting the rod 22 in an exemplary embodiment to stainless steel chain links 17, to the rotating connector 18, and/or to the feed line 16.

The first hub 30a is mounted on and attached proximate one end of the rod 22 via a bolt 36 and a nut 37 (or other known means of attachment) through a hole 24. The second hub 30b is mounted over and attached proximate the other end of the rod 22 via a bolt 36 and a nut 37 (or other known means of attachment) through a hole 24. The first end 62a of each of said plurality of yielding lines 60 may be fixed to the first hub 30a. The second end 62b of each of said plurality of yielding lines 60 is fixed to the second hub 30b.

In exemplary embodiments each hub 30 may have or be formed generally with one, more, or all of the following: a conical surface 38, a sidewall 40, a chamfer 42, a collar portion 44, a beveled edge 46, and a through-bore 48 for receiving the rod 22. The collar portion 44 may have one or more apertures 45 for receiving bolt 36. The chamfer 42 functions as a receiving surface for the holes (or notches, grooves, slits or slots) 32 and more particularly for receiving and optimally aligning the first end 62a and the second end 62b of each yielding line 60 (as further described below). The chamfer 42 may be useful to establish a desired off-set angle θ of the (or notches, grooves, slits or slots) 32.

The first end 62a and the second end 62b of each yielding line 60 may be fixed to the respective first hub 30a and second hub 30b via any known means of attachment. In the embodiment shown the respective first hub 30a and second hub 30b include holes (or notches, grooves, slits or slots) 32 for insertion of the respective first end 62a and the second end 62b of each yielding line 60. Further the respective first hub 30a and second hub 30b include counter-holes (or notches, grooves, slits or slots) 34 which intersect each of respective holes 32. The counter-holes 34 are for application of an adhesive or glue (or mechanical fastening such as welding or bolting; or other techniques as known in the art) to the respective ends 62a and 62b in the holes 32 for the purpose of fixing each respective yielding line 60 in its respective hole 32.

The glancing impingement device(s) 50 generally have an annular inverted conical surface 52 (annular inverted conical surface 52 being the surface of a truncated cone) as an upper end and may have a conical cavity 54 on the lower end. One glancing impingement device 50 may be mounted over and surrounding the rod 22, and mounted or resting on top of the first hub 30a. Another glancing impingement device 50 mounted over and surrounding the rod 22, and mounted or resting on top of the second hub 30b. In another embodiment (not shown), one or more of the glancing impingement device(s) 50 may be formed or made integral/unitary with the hub(s) 30 (at the upper end of the respective hub(s) 30).

Each of the plurality of yield lines 60 may be made of a variety of materials. The currently preferred yield line(s) 60 are cords of off-the-shelf yard trimmer line cut to the desired length. One suitable yard trimmer line in a given particulate material 12 loading application has about a 0.3 cm. diameter and is sold under the brand name ECHO Nylon Trimmer Line, commercially available from HOME DEPOT. By way of another example, the yield lines 60 could be bow springs (the bow spring may be made of a plurality of layers which has undergone a curing process to become cured laminated composite; and such layers may be a thermoplastic or a thermoset or any other suitable substance) or coil springs of suitable tension and strength.

In one embodiment as shown in FIG. 2 the first end 62a of each of the plurality of yielding lines 60 is fixed to the first hub 30a at a position (i.e. in hole 32a) which may be represented along a first vertical line 66a, and the second end 62b of each of said plurality of yielding lines 60 is fixed to the second hub 30b at another position (i.e. in hole 32b) which may be represented along a second vertical line 66b. The first vertical line 66a is staggered from the second vertical line 66b. By way of example, the first vertical line 66a may be staggered from the second vertical line 66b by an angle ranging from one-hundred (100°) to one-hundred forty degrees (140°) horizontally around the columnar body 20 (and therefore, accordingly, the point of attachment of the first end 62a of the respective yield line 60 is staggered from the point of attachment of the second end 62b by an angle ranging from 100°-140°). The staggering of the point of attachment of the first end 62a of the respective yield line 60 from the point of attachment of the second end 62b by an angle can be a means for spiraling each plurality of yielding lines 60. This may result in the spiral shape 68 of the free-standing portion 64 of each individual yield line 60 (and/or each yield line 60 may be fabricated having such spiral shape 68). In the embodiment represented in FIGS. 2 and 3 the first vertical line 66a is staggered from the second vertical line 66b by an angle in the range of about 120 to 130 degrees horizontally around the columnar body 20 (such may be best viewed in FIG. 3 where the respective end connection points 62a and 62b of the yield line 60 are seen not to be overlapping but rather positioned or staggered angularly about 120 to 130 degrees apart).

In one exemplary embodiment for use of the dampening and uniform loading device 10 for filling a particulate material 12 into a tube 14 includes dropping the particulate material 12 over a dampening and uniform loading device 10, rotating the dampening and uniform loading device 10, and dropping the particulate material 12 from the lower end of the dampening and uniform loading device 10. Further, in use, the particulate material 12 will glance off of a hub 30 and/or a glancing impingement device(s) 50 mounted on the rod 22. In use as represented in FIG. 1, the particulate material 12 upon impact will spring from a free-standing portion 64 of the plurality of yielding lines 60 (following fixing of the first end 62a and the second end 62b of the plurality of yielding lines 60 to the columnar body 20 as described above).

Further in use of the dampening and uniform loading device 10 it is to be understood that the inner diameter of tube 14 may vary. Accordingly, it may be desirable to adjust the extent of the radial reach of the spiral of free-standing portion 40 such that particulate material 12 will not simply bypass the outer circumference of the spiral of free-standing portion 40 within the tube 14, and such that the spiral of free-standing portion 40 will not readily interfere with the inner diameter of tube 14 and/or impingements 15. To enable individual user adjustment the bolt 36 may be loosened and removed from its respective hole 24 in rod 22 and from aperture 45 in collar portion 44, at which juncture the hub 30 is free to move vertically (up or down as user desired) along the rod 22 and reset and tightened at a newly desired position as defined by the selected hole 24 in the rod 22.

Adjustment of the second hub 30b relative to first hub 30a will adjust the extent of the radial reach of the spiral of free-standing portion 40 (i.e. moving the second hub 30b relatively closer to the first hub 30a will increase the circumference of the extent/distance of the radial reach of the spiral of free-standing portion 40, whereas moving the second hub 30b relatively further away from the first hub 30a will decrease the circumference of the extent/distance of the radial reach of the spiral of free-standing portion 40). Such extent of the radial reach of the spiral of free-standing portion 40 may also be adjusted by implementing yielding lines 60 or relatively longer or shorter length and/or adjusting the distance that the ends 62a and/or 62b or yield lines 60 are inserted into and fixed in hole(s) 32 (and also somewhat by varying the relative stiffness of the yield lines 60). The adjustment of the bolt 36 along the holes 24 in rod 22 and the vertical distance between the hubs 30a. 30b can also be a means for spiraling each plurality of yielding lines 60. Hence, each of the plurality of yielding lines 60 spirals due to the relative angle and/or relative vertical adjustment between where the ends 62a. 62b of the yielding lines 60 are attached and/or hubs 30a, 30b are located.

Likewise, if desired, the angularity of the spiral of free-standing portion 40 may be adjusted as desired by loosening the bolt 36 from the rod 22 and rotating the hub 30 clockwise or counter-clockwise relative to the rod 22 and resetting the bolt 36 on rood 22. This may also adjust the extent/distance of the radial reach of the spiral of free-standing portion 40.

The particulate material 12 could be a particulate other than catalyst.

While the exemplary embodiments are described with reference to various implementations and exploitations, it will be understood that these exemplary embodiments are illustrative and that the scope of the disclosed subject matter is not limited to them. Many variations, modifications, additions and improvements are possible.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the disclosed subject matter.

The invention claimed is:

1. An apparatus for dampening and uniformly loading a catalyst particulate material, comprising:
    a vertical catalyst reactor tube;
    a columnar body having a longitudinal axis aligned in a vertical direction within the vertical catalyst reactor tube;
    a plurality of yielding lines, each respectively fixed at a first end to a first point of the columnar body and at a second end to a second point of the columnar body, and having a free-standing portion between the first end and the second end; and
    wherein each of said plurality of yielding lines is configured to spiral around the columnar body along said free-standing portion,
    wherein the yielding lines are adjustable together to change a vertical distance between the first ends and the second ends along the columnar body such that the catalyst particulate material will not bypass an outer circumference of the plurality of yielding lines when filling the catalyst particulate material in the vertical catalyst reactor tube.

2. The apparatus according to claim 1, wherein the columnar body comprises:
    a rod;
    a first hub attached to one end of the rod, wherein the first end of each of said plurality of yielding lines is fixed to the first hub; and
    a second hub attached to another end of the rod, wherein the second end of each of said plurality of yielding lines is fixed to the second hub.

3. The apparatus according to claim 2, wherein the columnar body further comprises:
    a glancing impingement device mounted on top of said first hub.

4. The apparatus according to claim 3, wherein the columnar body further comprises another glancing impingement device mounted on top of said second hub.

5. The apparatus according to claim 4, wherein both said glancing impingement device and said other glancing impingement device comprise an annular inverted conical surface surrounding the columnar body.

6. The apparatus according to claim 2, wherein said first hub further comprises a glancing impingement device formed at an upper end of said first hub.

7. The apparatus according to claim 6, wherein said glancing impingement device comprises an annular inverted conical surface surrounding the columnar body.

8. The apparatus according to claim 1, wherein each of said plurality of yielding lines comprise a strand of nylon line.

9. The apparatus according to claim 1, wherein each of said plurality of yielding lines comprise a bow spring.

10. The apparatus according to claim 1, wherein each of said plurality of yielding lines comprise a coil spring.

11. The apparatus according to claim 2, wherein the first point is staggered from the second point by an angle.

12. The apparatus according to claim 11, wherein the angle ranges from 100 to 140 degrees horizontally around the columnar body.

13. The apparatus according to claim 11, wherein the angle is within the range of 120 to 130 degrees horizontally around the columnar body.

14. The apparatus according to claim 1, wherein said plurality of yielding lines comprises six yielding lines.

15. An apparatus for dampening and uniformly loading a catalyst particulate material inside a vertical catalyst reactor tube, comprising:
    a columnar body having a longitudinal axis aligned in a vertical direction within the vertical catalyst reactor tube;
    a plurality of yielding lines, each respectively fixed at a first end and at a second end to the columnar body, and having a free-standing portion between the first end and the second end;
    wherein the columnar body comprises, a rod, a first hub attached to one end of the rod, wherein the first end of each of said plurality of yielding lines is fixed to the first hub at a first point, and a second hub attached to another end of the rod, wherein the second end of each of said plurality of yielding lines is fixed to the second hub at a second point;
    wherein each of said plurality of yielding lines is configured to spiral around the columnar body along said free-standing portion, wherein the first point is staggered from the second point by an angle horizontally around the columnar body; and wherein the second hub is adjustable between a first position and a second position relative to the first hub, wherein the angle is greater in the first position than in the second position.

16. The apparatus according to claim 15, wherein the columnar body further comprises:

a glancing impingement device mounted on top of said first hub;

another glancing impingement device mounted on top of said second hub; and wherein both said glancing impingement device and said other glancing impingement device comprise an annular inverted conical surface surrounding the columnar body.

17. The apparatus according to claim 16, wherein the second hub is adjustable between a third position and a fourth position relative to the first hub, wherein a vertical distance between the first hub and the second hub is greater in the third position than in the fourth position.

18. The apparatus according to claim 17, further comprising a plurality of holes aligned along the vertical direction on the rod; and a bolt, wherein the second hub is adjustably mounted to one of the plurality of holes via the bolt.

19. The apparatus according to claim 2, further comprising a plurality of holes aligned along the vertical direction on the rod; and a bolt, wherein the second hub is adjustably mounted to one of the plurality of holes via the bolt.

20. The apparatus according to claim 2, wherein the second hub is adjustable between a first position and a second position relative to the first hub, wherein the first point is staggered from the second point by an angle, and wherein the angle is greater in the first position than in the second position.

21. The apparatus according to claim 20, wherein the second hub is adjustable between a third position and a fourth position relative to the first hub, wherein a vertical distance between the first hub and the second hub is greater in the third position than in the fourth position.

* * * * *